July 25, 1933.  E. E. EDWARDS  1,919,276
LIGHT SIGNAL
Filed Aug. 25, 1931
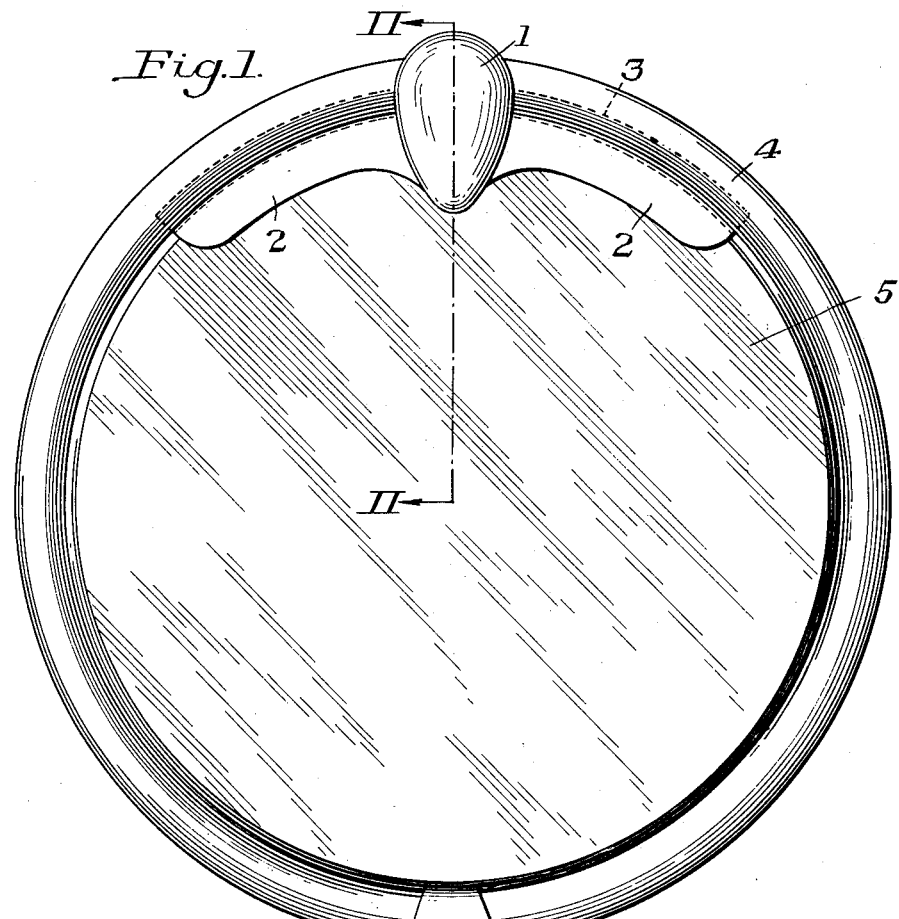
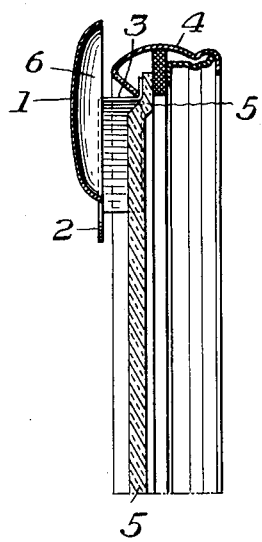
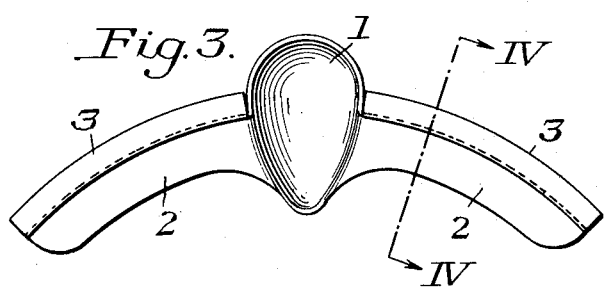
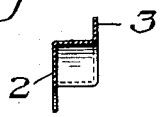
INVENTOR
Evan E. Edwards
by his attorneys
Byrnes, Stebbins, Parmelee + Blenko Patented July 25, 1933

1,919,276

UNITED STATES PATENT OFFICE

EVAN E. EDWARDS, OF NEW KENSINGTON, PENNSYLVANIA

LIGHT SIGNAL

Application filed August 25, 1931. Serial No. 559,165.

This invention relates broadly to signal lights and, more particularly, to motor vehicle headlights and is for a reflecting device which may be conveniently used on headlight rims, but it may also be applied to other types of lights, the light rays of which are not directly visible to the one in charge of such lights while sitting in the operator's seat.

At the present time, either headlight of a motor vehicle may be out of service or impaired and the driver totally unaware of the fact, which condition contributes greatly to the hazards of motoring and the likelihood of accidents.

The driver, upon being informed that one of the headlights is not functioning properly, can immediately take steps to rectify the condition and thus promote safe driving conditions which will materially reduce motor vehicle accidents.

According to this invention, there is provided a reflecting device which may be attached to a headlight or signal light in such a manner that a reflecting portion of the device will be illuminated so that the driver of the vehicle or tender of the light may at all times be informed as to whether or not the lamp is lighted and functioning properly.

A further object of the invention is to produce a device so constructed as to inform the driver of a motor vehicle while in the driver's seat whether or not the headlights are burning brightly or dimly, and whether or not one light is burning more brightly than the other. This device is so constructed that the reflecting part is softly yet positively illuminated, and in such a manner as to not interfere with the driver's vision of the road, and at the same time will positively inform him while sitting in the operator's seat, of the condition of his headlights. Furthermore, the device can be so constructed as to make an ornamental additions to the headlights, thereby enhancing the attractiveness of the vehicle.

In the accompanying drawing, I have shown for the purpose of illustration only, a preferred embodiment of the invention, it being understood that the drawing does not define the limits of my invention and that changes may be made in the construction and operation of my invention without departing from the spirit of the invention or the scope of my claim.

In the drawing:—

Figure 1 is a diagrammatic elevation of one form of the invention as applied to an ordinary motor vehicle headlight rim, Figure 2 is a vertical sectional view on the line II—II of Figure 1, looking in the direction of the arrows, Figure 3 is a rear elevation of one form of the device constructed in accordance with the invention, and Figure 4 is a section on line IV—IV of Figure 3.

In the drawing, 1 represents the light reflector which is arranged so that a portion of it is visible above the outside rim of the headlight. I have here shown it as of a concave shape. I have found that the device will function if the reflecting element 1 projects ⅛ inch or more above the headlight rim. The reflector 1 is formed integrally with the wings 2, the flanges 3 of which are bent so as to clamp between the outside rim 4 and the headlight lens 5. Between the rim and the reflecting surface of the light reflector 1 is a space 6 to allow light rays to pass from the headlight so as to illumine the reflector 1. Owing to the reflector being situated beyond the source of light, a beam or ray of light of low intensity will be directed by it toward the rear and will be visible to the driver of the vehicle. The reflector can be made of any material that will reflect light and may be attached to the rim in any manner or even formed integrally therewith.

I claim:

A tell-tale for a vehicle lamp having a lens and a securing ring therefor, comprising a sheet metal stamping with a spoon shaped reflecting portion adapted to overlie the periphery of the lamp, and integral wings extending laterally of said portion, said wings having the cross section of a Z-bar, one flange being adapted to engage the lens of the lamp under the securing ring therefor for securing the tell-tale to the lamp in spaced relation to the lens.

EVAN E. EDWARDS.